(12) United States Patent  (10) Patent No.: US 8,154,546 B2
Loop  (45) Date of Patent: Apr. 10, 2012

(54) RATIONAL Z-BUFFER FOR DECREASING A LIKELIHOOD OF Z-BUFFER COLLISIONS

(75) Inventor: Charles T. Loop, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 955 days.

(21) Appl. No.: 12/163,139

(22) Filed: Jun. 27, 2008

(65) Prior Publication Data

US 2009/0322746 A1   Dec. 31, 2009

(51) Int. Cl.
    *G06T 15/40* (2011.01)
(52) U.S. Cl. ......................................................... 345/422
(58) Field of Classification Search .................. 345/422, 345/619
    See application file for complete search history.

(56) References Cited

U.S. PATENT DOCUMENTS

| | | | |
|---|---|---|---|
| 5,812,138 A | 9/1998 | Devic | |
| 5,825,363 A | 10/1998 | Anderson | |
| 5,856,829 A * | 1/1999 | Gray et al. | 345/422 |
| 6,115,047 A | 9/2000 | Deering | |
| 6,411,295 B1 | 6/2002 | Hung et al. | |
| 6,453,065 B1 * | 9/2002 | Lapidous et al. | 382/154 |
| 6,618,048 B1 | 9/2003 | Leather | |
| 6,677,945 B2 * | 1/2004 | Lapidous et al. | 345/422 |
| 7,050,054 B2 | 5/2006 | Halmshaw | |
| 7,092,862 B2 | 8/2006 | Hooks | |
| 7,218,323 B1 | 5/2007 | Halmshaw et al. | |
| 7,250,948 B2 | 7/2007 | Hayes et al. | |
| 7,268,779 B2 | 9/2007 | Piazza et al. | |
| 2007/0132766 A1 | 6/2007 | Kim et al. | |

OTHER PUBLICATIONS

"Set_Polygon_Offset" http://www.docs.hp.com/en/B2355-90143/ch06s04.html.
Johnson et al, "The Irregular Z-Buffer and its Application to Shadow Mapping", 8 Pages, 2004.
Wand et al,"The Randomized z-Buffer Algorithm: Interactive Rendering of Highly Complex Scenes" 2001, 10 Pages.

* cited by examiner

*Primary Examiner* — Xiao M. Wu
*Assistant Examiner* — Kim-Thanh T Tran
(74) *Attorney, Agent, or Firm* — Lyon & Harr, LLP; Mark A. Watson

(57) ABSTRACT

A "Rational Z-Buffer" provides various techniques for reducing artifacts when rendering graphics using z-buffers. In particular, the Rational Z-Buffer reduces the likelihood of z-buffer collisions when using hardware or software z-buffer algorithms to render graphics by delaying homogenous division of pixels until after occlusion testing. Further, occlusion testing between any two pixels, $p_0$ and $p_1$, is accomplished by comparing rational depth values, $r_0 = \{z_0, w_0\}$ and $r_1 = \{z_1, w_1\}$, for pixel $p_0$ and $p_1$ to determine which pixels are visible. Depth values are compared by determining whether the expression $z_0 w_1 < z_1 w_0$ is true. If true, then pixel $p_0$ occludes pixel $p_1$ in clipping cube space relative to an image-plane defined by a particular viewpoint and the field of view. Further, since homogeneous division by w is not performed prior to occlusion testing, rational depth values are uniformly distributed clipping-cube space, thereby significantly reducing potential z collisions relative to conventional z-buffer testing.

20 Claims, 5 Drawing Sheets

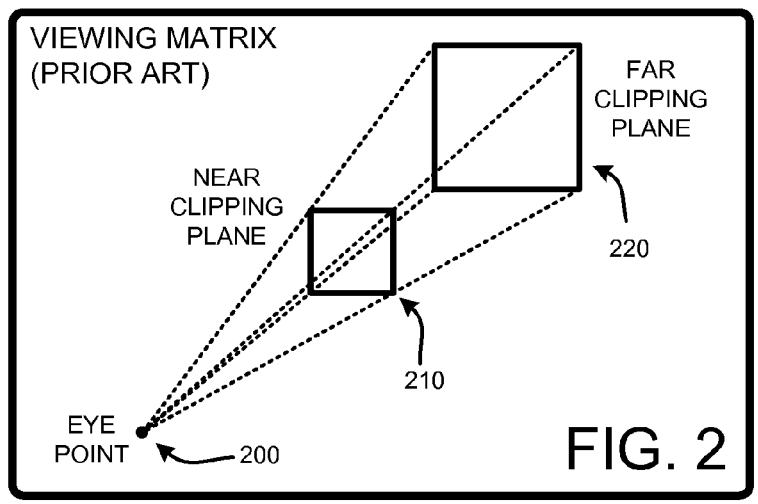
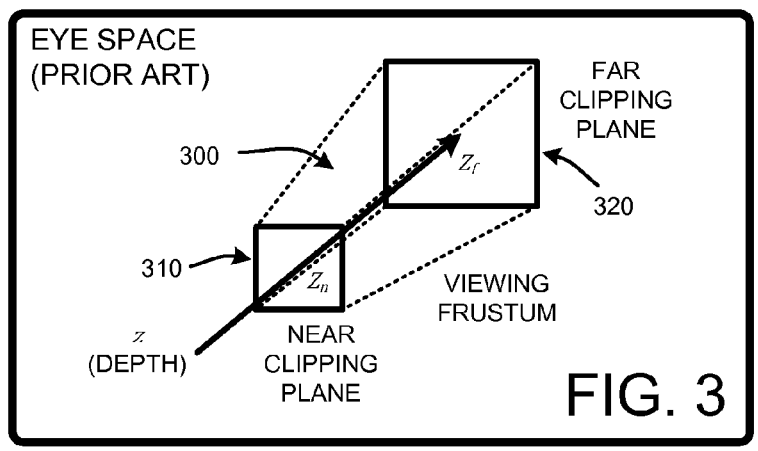
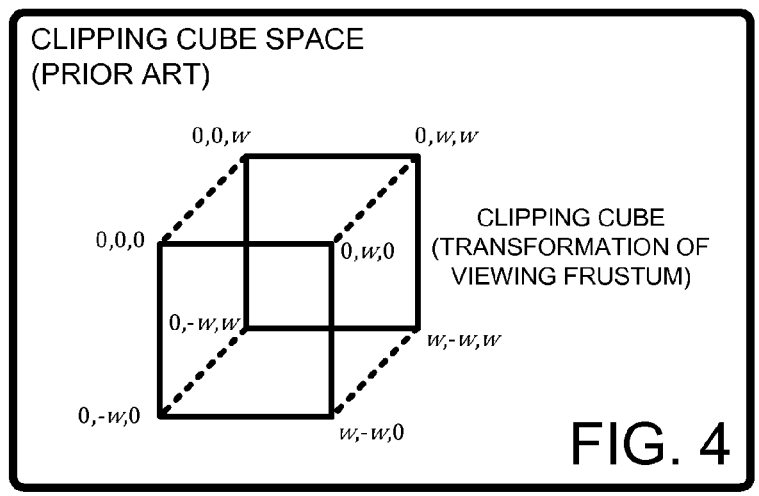

RATIONAL Z-BUFFER FOR DECREASING A LIKELIHOOD OF Z-BUFFER COLLISIONS

BACKGROUND

1. Technical Field

A "Rational Z-Buffer" provides techniques for reducing artifacts when rendering graphics using z-buffers, and in particular, various techniques for reducing the likelihood of z-buffer collisions when using hardware or software z-buffer algorithms to render graphics.

2. Related Art

As is well known to those skilled in the art, the z-buffer algorithm is the most common technique for displaying only the visible portions of a scene in 3D computer graphics applications. It is generally implemented in graphics hardware, though software-only implementations can be used as well. The term z-buffer refers to an array of numbers whose dimensions correspond to the pixel array of an image, or framebuffer, to be rendered. The computer representation of these numbers varies; they are typically 16- or 32-bit integer or floating point, but can be any size desired, depending upon the available graphics hardware or software.

The imaging model used in typical 3D computer graphics can be thought of as a collection of rays passing from an eye-point through each pixel in an image-plane. The distance from the eye-point along such a pixel ray is the associated depth, or "z value" of the pixel. All values of the z-buffer are initialized to be greater than the largest expected depth value in a scene. Geometric primitives such as, but not limited to, triangles and line segments, are rasterized by determining which pixels of the frame buffer they cover, and at what depth.

The z-buffer algorithm works by performing a z-test on every possibly visible pixel in a scene. The z-test works as follows: before writing the color value associated with a primitive at a pixel, the (new) z value of the pixel is compared to the (old) z value associated with the pixel stored in the z-buffer. If the new z value is less than the old z value, then the color is written to the frame buffer and the new z value is written to the z-buffer. After all primitives are rendered, only portions of primitives closest to the eye-point will be visible. This corresponds to physical reality where close object occlude distance ones on the same line-of-sight.

Unfortunately, one of the problems with the use of conventional z-buffer algorithms is that since z-buffers represent numbers with finite precision, it is often the case that distinct depth values for different pixels map to the same values when rendering images using z-buffers. This type of z-buffer collision often causes visible artifacts in images at the level of individual pixels.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, in contrast to conventional z-buffer testing, for each pixel at screen position, x y, a "Rational Z-Buffer," as described herein, determines corresponding z and w values by evaluating a linear equation in x and y. The linear equations have the property that vertices are interpolated. These interpolated depth values are subject to the same non-uniform distribution in clipping-cube space as vertices.

Further, instead of storing a single values corresponding to the result of the division z/w (as with conventional z-buffer testing), the Rational Z-Buffer stores both the z and w components as separate values, in either the same or separate buffers. In this way, the Rational Z-Buffer represents the depth of each pixel in clipping-cube space as a rational number $\{z, w\}$.

Then, given rational depth values $r_0 = \{z_0, w_0\}$ and $r_1 = \{z_1, w_1\}$, for pixel $p_0$ and $p_1$, respectively, the Rational Z-Buffer performs occlusion testing of those two pixels relative to a particular viewpoint (i.e., an eye-point) by determining whether the expression $z_0 w_1 < z_1 w_0$ is true. If true, then pixel $p_0$ occludes pixel $p_1$ in clipping cube space relative to an image-plane defined by the particular viewpoint and the field of view.

In other words, the Rational Z-Buffer stores both z and w components of a pixel's clipping cube space coordinates in a depth buffer. These coordinates are then used to replacing the conventional z-buffer test (i.e., $z_0 < z_1$) with a "rational z-buffer test" $z_0 w_1 < z_1 w_0$. Non-occluded pixels are then provided to a frame buffer and rendered using conventional rendering techniques. Note that in clipping-cube space, since both z and w are linear in eye-space z, these values are uniformly distributed in the rational z-buffer. As a result, potential z collisions are greatly reduced relative to conventional z-buffer testing, thereby significantly reducing artifacts resulting from z collisions.

In view of the above summary, it is clear that the Rational Z-Buffer described herein provides various unique techniques for reducing the likelihood of z-buffer collisions when using hardware or software z-buffer algorithms to render graphics. In addition to the just described benefits, other advantages of the Rational Z-Buffer will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

FIG. 2 illustrates a conventional viewing matrix from an eye-point relative to near and far clipping planes, as described herein.

FIG. 3 provides a conventional eye-space view of the viewing matrix of FIG. 2, showing a three-dimensional volume bounded by a viewing frustum within which objects are rendered, as described herein.

FIG. 4 provides a conventional clipping-cube space view of the viewing frustum of FIG. 3, showing a clipping cube that represents a transformation from the viewing frustum of FIG. 3, as described herein.

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Rational Z-Buffer" as described herein, first determines corresponding z and w values by evaluating a linear equation in x and y for each pixel at screen position, x y. The linear equations have the property that vertices are interpolated. These interpolated depth values are subject to the same non-uniform distribution in clipping-cube space as vertices.

Further, instead of storing a single values corresponding to the result of the division z/w (as with conventional z-buffer testing), the Rational Z-Buffer stores both the z and w components as separate values, in either the same or separate buffers. In this way, the Rational Z-Buffer represents the depth of each pixel in clipping-cube space as a rational number $\{z, w\}$.

Then, given rational depth values $r_0=\{z_0, w_0\}$ and $r_1=\{z_1, w_1\}$, for pixel $p_0$ and $p_1$, respectively, the Rational Z-Buffer performs occlusion testing of those two pixels relative to a particular viewpoint (i.e., an eye-point) by determining whether the expression $z_0 w_1 < z_1 w_0$ is true. If true, then pixel $p_0$ occludes pixel $p_1$ in clipping cube space relative to an image-plane defined by the particular viewpoint and the field of view. Non-occluded pixels are then provided to a frame buffer and rendered using conventional rendering techniques. Note that in clipping-cube space, since both z and w are linear in eye-space z, these values are uniformly distributed in the rational z-buffer. As a result, potential z collisions are greatly reduced relative to conventional z-buffer testing, thereby significantly reducing artifacts resulting from z collisions.

Figure 1:
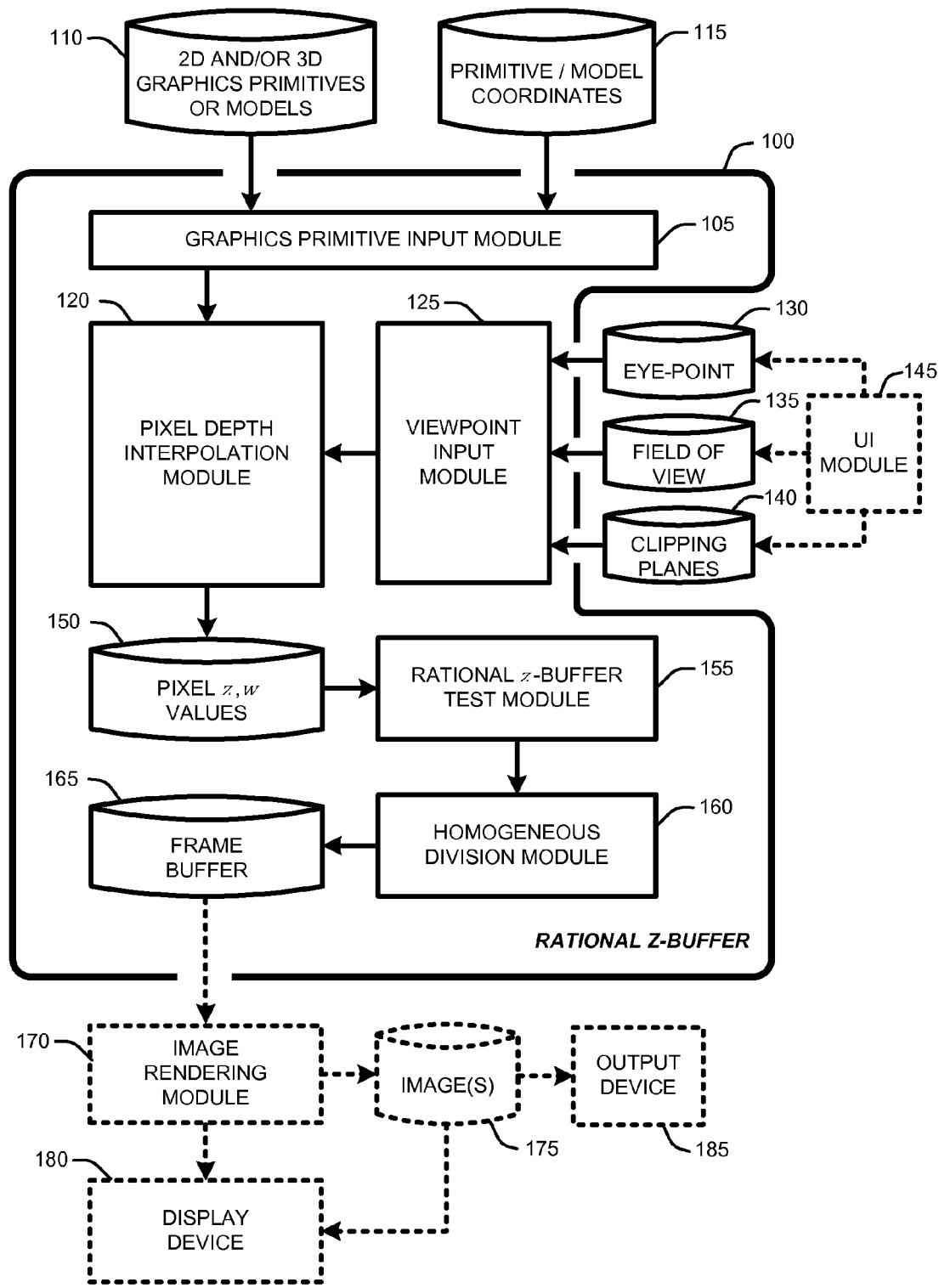
FIG. 1 provides an exemplary architectural flow diagram that illustrates program modules for implementing various embodiments of a "Rational Z-Buffer," as described herein.

1.1 System Overview:

As noted above, the Rational Z-Buffer provides various techniques for reducing the likelihood of z-buffer collisions when using hardware or software z-buffer algorithms to render graphics. The processes summarized above are illustrated by the general system diagram of FIG. 1. In particular, the system diagram of FIG. 1 illustrates the interrelationships between program modules for implementing various embodiments of the Rational Z-Buffer, as described herein. Furthermore, while the system diagram of FIG. 1 illustrates a high-level view of various embodiments of the Rational Z-Buffer, FIG. 1 is not intended to provide an exhaustive or complete illustration of every possible embodiment of the Rational Z-Buffer as described throughout this document.

In addition, it should be noted that any boxes and interconnections between boxes that may be represented by broken or dashed lines in FIG. 1 represent alternate embodiments of the Rational Z-Buffer described herein. Further, any or all of these alternate embodiments, as described below, may be used in combination with other alternate embodiments that are described throughout this document.

In general, as illustrated by FIG. 1, the processes enabled by the Rational Z-Buffer 100 begin operation by using a graphics primitive input module 105 to receive 2D and/or 3D graphics primitives or models 110 (i.e., 3D objects). In addition, the graphics primitive input module 105 also receives relative coordinates 115 for the graphics primitives or models 110.

These graphics primitives or models 110 are then provided with the coordinates 115 to a pixel depth interpolation module 120. In addition, a viewpoint input module 125 provides viewpoint information, including eye-point 130 coordinates, field of view 135, and near and far clipping planes 140, to the pixel depth interpolation module 120. Given this information, the pixel depth interpolation module 120 computes z and w values 150 for each pixel in clipping cube space following a transformation from eye-space (relative to a viewing frustum defined by the viewpoint information (130, 135 and 140), as described in Section 2.3. Note that in various embodiments, the pixel z and w values 150 are either stored in separate buffers (i.e., a z-buffer and a w-buffer), or as separate values in a single z-buffer.

The pixel z and w values 150 are then provides to a rational z-buffer test module 155 that determines whether a first pixel occludes a second pixel by using a rational z-buffer test which treats the depth of each pixel as a rational number $\{z, w\}$. In other words, as described in further detail in Section 2.3, in contrast to conventional z-buffer tests, the rational z-buffer test module 155 performs occlusion testing prior to homogeneous division (i.e., z/w) (see discussion of conventional homogeneous division in Section in 2.1).

In particular, given two rational depth values for the first and second pixel, $r_0=\{z_0, w_0\}$ and $r_1=\{z_1, w_1\}$, respectively, the rational z-buffer test module 155 checks whether $z_0 w_1 < z_1 w_0$ is true. If this occlusion test is true, then the second pixel (having a rational depth of $r_1=\{z_1, w_1\}$) is occluded by the first pixel (having a rational depth of $r_0=\{z_0, w_0\}$). If the test is false, then the second pixel occludes the first pixel. The rational z-buffer test module 155 repeats this occlusion test for every potentially occluded pixel within clipping-cube space. Then, the rational z-buffer test module 155 outputs the non-occluded pixels to a homogeneous division module 160 which performs homogeneous division of the non-occluded pixels. The resulting pixels are then passed to a conventional frame buffer 165.

A conventional image rendering module 170 then receives the contents of the frame buffer 170 and renders an image 175 which is either stored for later use, displayed on a conventional display device 180 (such as computer screen, for example), or provided to an output device 185 for printing or other uses, as desired.

2.0 Operational Details of the Rational Z-Buffer:

The above-described program modules are employed for implementing various embodiments of the Rational Z-Buffer. As summarized above, the Rational Z-Buffer provides various techniques for reducing the likelihood of z-buffer collisions when using hardware or software z-buffer algorithms to render graphics. The following sections provide a detailed discussion of the operation of various embodiments of the Rational Z-Buffer, and of exemplary methods for implementing the program modules described in Section 1 with respect to FIG. 1. In particular, the following sections include discussions of various embodiments of the Rational Z-Buffer, including: conventional geometric transforms; a discussion of clipping-cube space; and operational details of the Rational Z-Buffer.

2.1 Conventional Geometric Transforms:

Geometric transformations are commonly used in conventional 3D computer graphics. For example, objects displayed in a synthetic/virtual 3D space, e.g. film and games, are represented as collections of primitive objects. These primitives are generally triangles or line segments connecting vertices. The geometry of a vertex is characterized by a four dimensional homogeneous vector [x y z w], where the three dimensional coordinates are given by the ratios, or rational numbers $$\left[\frac{x}{w} \quad \frac{y}{w} \quad \frac{z}{w}\right].$$

The process of dividing the coordinates by w is known as homogeneous division.

In other words, the Cartesian coordinates of a point may be expressed as (x, y, z) with respect to the three orthogonal axes. The problem encountered in using them, however, is that ideal points at infinity cannot be handled because x, y or z (or all three) become infinite. However, if a point moves towards infinity in a fixed direction then the ratios x:y:z remain constant. Therefore, a fourth number w can be introduced to re-express the coordinates as $$\left[\frac{x}{w} \quad \frac{y}{w} \quad \frac{z}{w}\right],$$

noting that the ratios between x, y and z are unaffected by the use of w. Therefore, the point, or pixel, (x, y, z) can be re-expressed as point (x, y, z, w) as if working in four dimensions, i.e., w is regarded as a fourth coordinate. Further, if w=1, then $$\left(\frac{x}{w}, \frac{y}{w}, \frac{z}{w}\right) = (x, y, z).$$

The first step in determining the projected image of a synthetic model is to transform its vertices using a 4×4 transformation matrix. This transformation matrix is generally the product of two other 4×4 matrices; a viewing matrix, and a projection matrix.

In particular, the viewing matrix is determined by the position of the eye-point, and three orthonormal vectors that specify the orientation of an "eye-space" coordinate frame. The role of the viewing matrix is to transform a vertex into a coordinate system that has the eye-point at the origin, and the direction of view corresponding to the positive z axis. In other words, as illustrated by FIG. 2, in "eye space" all objects are translated so that the eye 200 is at the origin and is looking down the positive z axis towards objects between a near clipping plane 210 and a far clipping plane 220.

Next, vertices are transformed by the projection matrix. The projection matrix P generally has the form illustrated below by Equation (1), though variations in this form are possible:

$$P = \begin{bmatrix} \alpha & 0 & 0 & 0 \\ 0 & \beta & 0 & 0 \\ 0 & 0 & \frac{Z_f}{Z_f - Z_n} & 1 \\ 0 & 0 & \frac{Z_n Z_f}{Z_n - Z_f} & 0 \end{bmatrix} \quad \text{Equation (1)}$$

where $\alpha$ and $\beta$ are the cotangents of the half angles representing the horizontal and vertical field of view, and $Z_n$ and $Z_f$ are the distances of the near and far clipping planes. As illustrated by FIG. 3, these parameters define a viewing frustum 300, represented by a distorted cube used to cull geometry not visible in the image to be rendered. Depth limits of the viewing frustum 300 are defined by the near and far clipping planes (310 and 320, respectively) having depth values of $Z_n$ and $Z_f$, respectively relative to the eye-point.

The effect of the projection transform is to un-distort the viewing frustum into a cube-like shape, as illustrated by FIG. 4; that is a box where x, y ∈ [−w, w] and z ∈ [0, w]. Note that it is generally assumed that w=1 for an eye-space vertex, however, other values of w can be used, if desired. As an optimization, all primitives outside the region of this cube-like shape are discarded, or clipped against it to form new primitives within the interior of the cube-like shape. Because the cube-like shape defines clipping boundaries, it is referred to herein as "clipping cube" space, as described in further detail in Section 2.2

2.2 Clipping Cube Space:

The following discussion addresses the issue of what happens to z values in clipping cube space.

Specifically, a homogeneous 4D vector portion of a vertex (i.e., vector [x y z w]) is pre-multiplied by P (see Equation (1)), resulting in the transformation illustrated below by Equation (2):

$$\left[\alpha x \quad \beta y \quad \frac{Z_f z - Z_n Z_f w}{Z_f - Z_n} \quad z\right] \quad \text{Equation (2)}$$

After homogeneous division (i.e., dividing the coordinates by w), the depth (z) value in clipping cube space can be written as a function of eye-space z, as illustrated by Equation (3), where:

$$f(z) = \frac{Z_f(z - Z_n)}{z(Z_f - Z_n)} \quad \text{Equation (3)}$$

where it is assumed that w=1 for an eye-space vertex.

Plotting f(z) illustrates a classic problem encountered in conventional z-buffer implementations. For example, FIG. 5 illustrates a graph of f(z), where the vertical axis represents clipping cube space for z from z=1 to 100, and the horizontal axis represents eye space for z, for $Z_n$=1 and $Z_f$=100.

Figure 5:
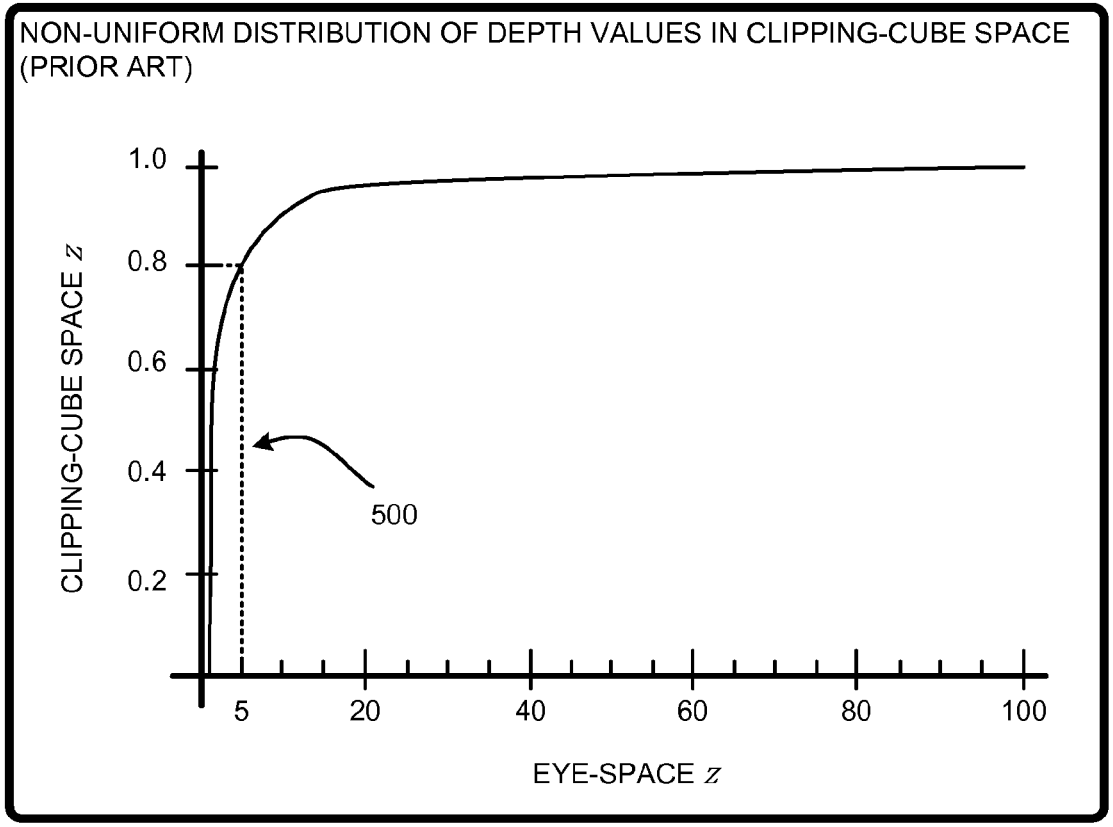
FIG. 5 provides a conventional plot of eye-space vs. clipping-cube space, showing a non-uniform distribution of eye-space depth values in clipping-cube space, as described herein.

As can be seen by the graph shown in FIG. 5, one problem with conventional z-buffer implementations is a non-uniform distribution of depth values. For example, in the graph shown in FIG. 5, depth values in the range of 1 to 5 in eye-space (horizontal axis) are transformed to values ranging from about 0 to about 0.8 in clipping cube space (see area of graph denoted by broken line 500). In contrast, depth values from about 5 to 100 in eye-space are transformed to values ranging from about 0.8 to 1. In other words, the first approximately 5% of depth values in eye-space use up 80% of the available z-buffer values in clipping cube space, while the last 95% of depth values are squeezed into the remaining 20% of the available z-buffer values.

Since z-buffers represent numbers with finite precision, it is possible (and often the case) that distinct depth values in eye-space map to the same depth value in clipping cube space. When distinct depth values in eye-space map to the same depth value in clipping cube space this is generally referred to as a z-buffer collision. These types of z-buffer collisions often cause visible artifacts at the pixel level in images, since closer objects may not pass the z-test, resulting in the problem of pixels from occluded objects being displayed in the closer object. In order to minimize these artifacts, developers of 3D computer graphics applications must carefully choose the values of $Z_n$ and $Z_f$. Even so, pixel artifacts due to z-buffer collisions can, and do, occur in conventional z-buffer systems.

2.3 Rational Z-Buffer:

The Rational Z-Buffer decreases the likelihood of z-buffer collisions, thereby reducing rendering artifacts. Further, since the likelihood of collisions are reduced, graphics developers are free to select from a broader range of $Z_n$ and $Z_f$ values, thereby improving image quality without risking the artifacts that would result in conventional z-buffer systems. In general, the Rational Z-Buffer achieves this reduction in collisions by deferring homogeneous division until after the z-buffer test, while using the rational representation of values for depth comparison.

The description of the computer z-buffer based graphics imaging model provided in Sections 2.1 and 2.2 is somewhat over-simplified in that it generally describes only the transformation of individual vertices. Clearly, as is known to those skilled in the art of computer graphics, rendering entire primitives requires rasterization to determine pixel coverage. However, specific details of the rasterization process are not necessary for an understanding the operational details of the Rational Z-Buffer.

In particular, it is important to understand that for a given covered pixel at x y, a corresponding z and w can be determined by evaluating a linear equation in x and y. The linear equations have the property that vertices are interpolated. These interpolated depth values are subject to the same non-uniform distribution in clipping cube space as vertices.

The solution to this problem is referred to as a "rational z-buffer." In contrast to conventional z-buffer based techniques that store a single value corresponding to the result of the homogeneous division, z/w, the Rational Z-Buffer stores both the z and w components in separate buffers (or alternately as separate values in the same buffer). In this way, the Rational Z-Buffer represents depth as a rational number $\{z, w\}$, with the requirement that w>0. Note that this requirement can be enforced by multiplying z and w by −1 in the case that w<0.

The, given two rational depth values, $r_0=\{z_0, w_0\}$ and $r_1=\{z_1, w_1\}$, the following can be concluded:

$$r_0 < r_1 \quad \text{Equation (4)}$$

$$\frac{z_0}{w_0} < \frac{z_1}{w_1} \quad \text{Equation (5)}$$

$$z_0 w_1 < z_1 w_0 \quad \text{Equation (6)}$$

Note that by the assumption $w_i>0$, cross multiplication by $w_0$ and $w_1$ will not change the sense of the inequality. Further, as noted above, the requirement that w>0 can always be maintained by multiplying both z and w by −1 if needed. Furthermore, w≠0 since such vertices will lie outside the clipping cube.

Thus, in view of the preceding discussion, the Rational Z-Buffer can be implemented in two basic parts, as summarized below, including:

1. Storing both z and w components of a pixel's clipping cube space coordinates in a depth buffer (either the same or different buffers). In keeping with the format of conventional graphics card hardware, these numbers (z and w) are generally implemented as 16-, 24- or 32-bit integer or floating point values. However, it should be clear that both hardware and software implementations of the Rational Z-Buffer can use integer or floating point values, or a mix of integer and floating point values, for z and w, that are of any desired precision.
2. Replacing the conventional z-buffer test, $z_0<z_1$, with the rational z-buffer test, $z_0 w_1 < z_1 w_0$.

Finally, in clipping cube space, since both numerator (z) and denominator (w) are linear in eye-space z, these values are uniformly distributed in the rational z-buffer. Therefore, no distortion of depth values will occur, so the choice of $Z_n$ and $Z_f$ is much less important. However, it should be noted that while artifacts associated with z collisions are greatly reduced, the possibility of z collisions is not entirely eliminated since z and w still have finite precision.

Figure 6:
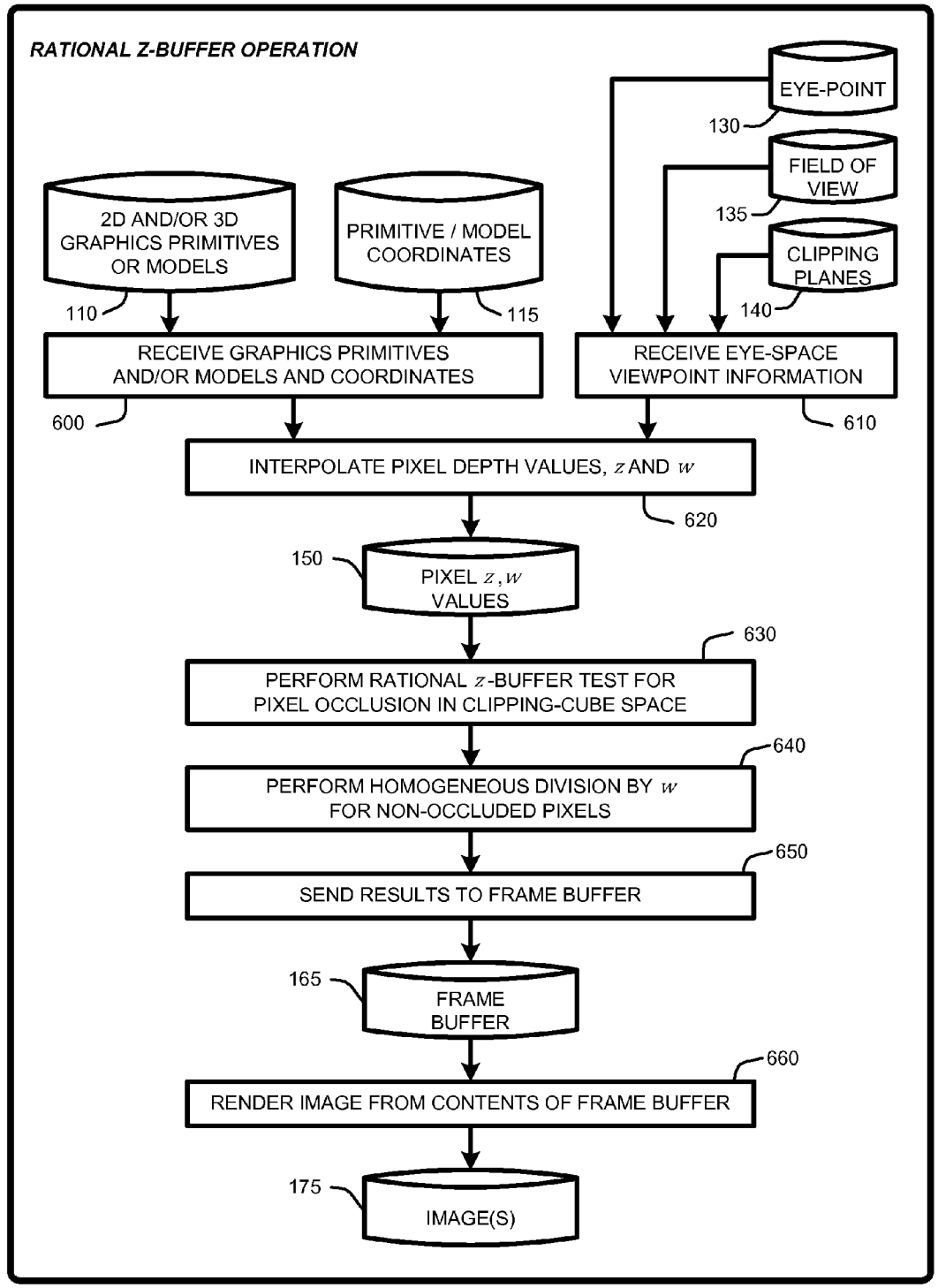
FIG. 6 illustrates a general system flow diagram that illustrates exemplary methods for implementing various embodiments of the Rational Z-Buffer, as described herein.

3.0 Operational Summary of the Rational Z-Buffer:

The processes described above with respect to FIG. 1 through FIG. 5, and in further view of the detailed description provided above in Sections 1 and 2, are illustrated by the general operational flow diagram of FIG. 6. In particular, FIG. 6 provides an exemplary operational flow diagram that illustrates operation of some of the various embodiments of the Rational Z-Buffer described above. Note that FIG. 6 is not intended to be an exhaustive representation of all of the various embodiments of the Rational Z-Buffer described herein, and that the embodiments represented in FIG. 6 are provided only for purposes of explanation.

Further, it should be noted that any boxes and interconnections between boxes that may be represented by broken or dashed lines in FIG. 6 represent optional or alternate embodiments of the Rational Z-Buffer described herein. Further, any or all of these optional or alternate embodiments, as described below, may be used in combination with other alternate embodiments that are described throughout this document.

In general, as illustrated by FIG. 6, the Rational Z-Buffer begins operation by receiving 600 one or more graphics primitives and/or models 110 along with relative coordinates 115 of the graphics primitives and/or models. In addition, the Rational Z-Buffer also receives 610 eye-space viewpoint information which defines the point in space (i.e., eye-point 130) from which the graphics primitives and/or models 110 are to be viewed relative to a particular field of view 135 and near and far clipping planes 140.

Given this information, the Rational Z-Buffer interpolates 620 rational pixel depth values 150, $r=\{z, w\}$, for each pixel in clipping cube-space. The Rational Z-Buffer then performs 630 the rational z-buffer test, $z_0 w_1 < z_1 w_0$, for each covered pixel, to determine which pixels are visible (i.e., non-occluded) in clipping cube space. The Rational Z-Buffer then performs 640 a homogeneous division of the non-occluded pixels, and sends 650 the results to the frame buffer 165.

Finally, once the frame buffer 165 has been populated with information defining the non-occluded pixels, the data in the frame buffer can then be used to render 660 the image 175 using conventional graphics rendering techniques.

Figure 7:
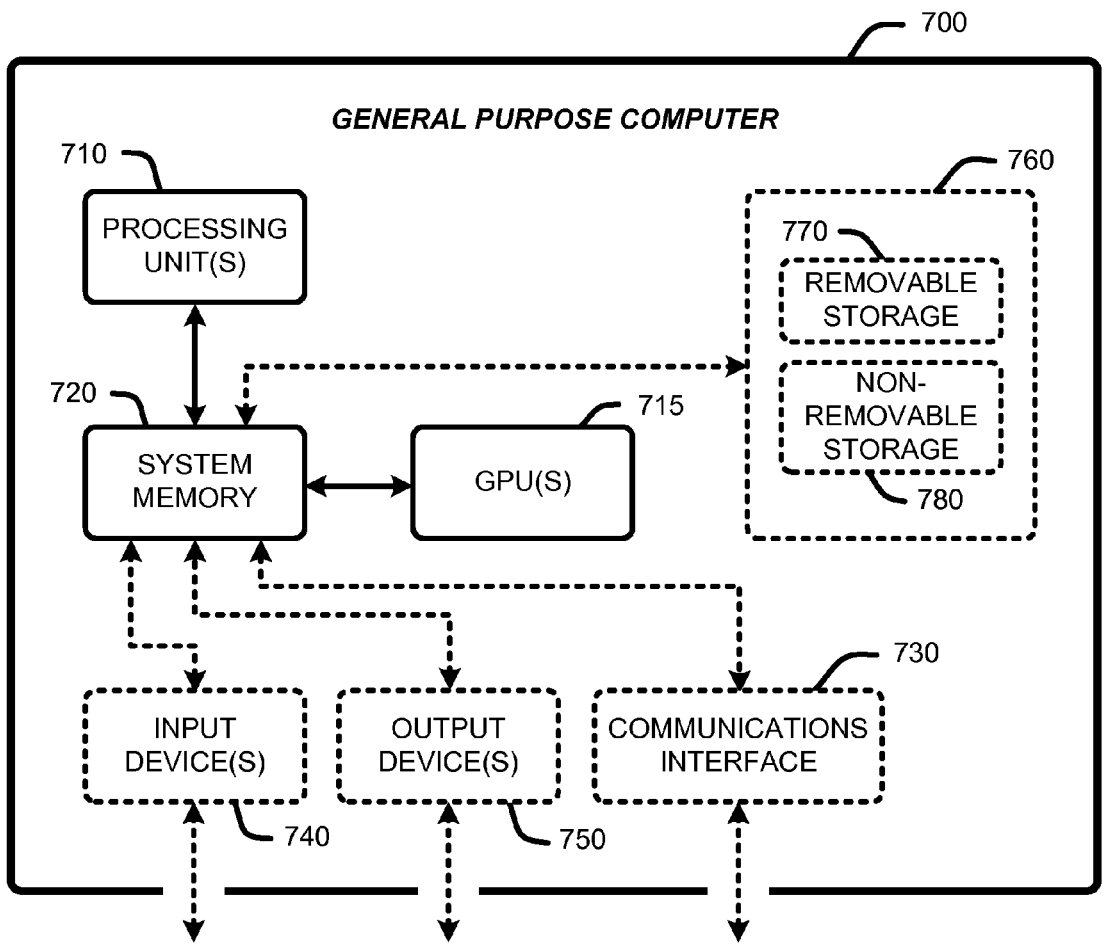
FIG. 7 is a general system diagram depicting a simplified general-purpose computing device having simplified computing and I/O capabilities for use in implementing various embodiments of the Rational Z-Buffer, as described herein.

4.0 Exemplary Operating Environments:

The Rational Z-Buffer is operational within numerous types of general purpose or special purpose computing system environments or configurations, including both hardware and software implementations z-buffer algorithms to render graphics. FIG. 7 illustrates a simplified example of a general-purpose computer system on which various embodiments and elements of the Rational Z-Buffer, as described herein, may be implemented. It should be noted that any boxes that are represented by broken or dashed lines in FIG. 7 represent alternate embodiments of the simplified computing device, and that any or all of these alternate embodiments, as described below, may be used in combination with other alternate embodiments that are described throughout this document.

For example, FIG. 7 shows a general system diagram showing a simplified computing device. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, video media players, etc.

At a minimum, to allow a device to implement the Rational Z-Buffer, the device must have some minimum computational capability along with either a software or hardware implementation of a z-buffer. In the case of a hardware implementation, the z-buffer will be included as a component in a graphics processing unit (GPU).

In particular, as illustrated by FIG. 7, the computational capability is generally illustrated by one or more processing unit(s) 710, and may also include one or more GPUs 715. Note that the processing unit(s) 710 of the general computing device of may be specialized microprocessors, such as a DSP, a VLIW, or other micro-controller, or can be CPUs having one or more processing cores, including one or more specialized GPU-based cores in a multi-core CPU.

In addition, the simplified computing device of FIG. 7 may also include other components, such as, for example, a communications interface 730. The simplified computing device of FIG. 7 may also include one or more conventional computer input devices 740. The simplified computing device of FIG. 7 may also include other optional components, such as, for example one or more conventional computer output devices 750. Finally, the simplified computing device of FIG. 7 may also include storage 760 that is either removable 770 and/or non-removable 780. Note that typical communications interfaces 730, input devices 740, output devices 750, and storage devices 760 for general-purpose computers are well known to those skilled in the art, and will not be described in detail herein.

The foregoing description of the Rational Z-Buffer has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Rational Z-Buffer. It is intended that the scope of the invention be limited not by this detailed description, but rather by the claims appended hereto.

What is claimed is:

1. A method for performing depth-based occlusion testing for pixels, comprising steps for:
    interpolating z and w values for each pixel in clipping-cube space from corresponding graphics primitives and corresponding coordinates in eye-space;
    for each pixel at a particular x, y point in an image plane defined by an eye-point and a field of view, determining whether that pixel is occluded by any other pixels at the same x, y point; and
    wherein the determination of occlusion between any two pixels is accomplished by comparing a product of the z value of a first pixel and the w value of a second pixel with a product of the z value of the second pixel and the w value of the first pixel to determine which product is smaller.

2. The method of claim 1 wherein the clipping-cube space is further delimited by near and far clipping planes relative to a depth from the eye point.

3. The method of claim 1 further comprising steps for writing pixel information for each non-occluded pixel to a frame buffer.

4. The method of claim 3 further comprising steps for rendering the contents of the frame buffer to generate an image.

5. The method of claim 1 wherein the eye point is specified via a user interface.

6. The method of claim 1 wherein the field of view is specified via a user interface.

7. A system for determining visibility of pixels in a viewing plane relative to a plurality of graphics primitives arranged within a 3D space, comprising:
    a device for receiving a plurality of graphics primitives and coordinates defining their relative orientation in a 3D space;
    a device for receiving information defining a viewing space relative to the 3D space, said viewing space being delimited by a field of view and near and far clipping planes relative to a viewing point;
    a device for determining extents of a 2D viewing plane delimited by x, y pixel coordinates relative to the viewing point and the field of view;
    a device for transforming the viewing space into a clipping cube space;
    a device for interpolating z and w values for each pixel in clipping-cube space from corresponding graphics primitives and corresponding coordinates; and
    a device for determining which pixels are visible in the 2D viewing plane relative to the viewing point, comprising:
        for a first pixel of any graphics primitive having the same x, y pixel coordinates in the 2D viewing plane as a second pixel, computing a first rational depth value by computing a product of the z value of the first pixel and the w value of a second pixel,
        for the second pixel, computing a second rational depth value by computing a product of the z value of the second pixel and the w value of the first pixel, and
        wherein the pixel having the smallest rational depth value is determined to be visible.

8. The system of claim 7 further comprising a device for performing a homogenous division of the visible pixels.

9. The system of claim 8 further comprising a device writing pixel information for each homogenously divided visible pixel to a frame buffer.

10. The system of claim 9 further comprising a device for rendering the contents of the frame buffer to generate an image.

11. The system of claim 7 wherein the z and w values for each pixel are written to separate buffers prior to determining which pixels are visible.

12. The system of claim 7 wherein the z and w values for each pixel are written to the same buffer prior to determining which pixels are visible.

13. The system of claim 7 wherein the near and far clipping planes are each identified by specifying a corresponding z depth relative to the viewing point.

14. The system of claim 7 wherein the view point is specified via a user interface as a 3D point in the 3D space.

15. The system of claim 7 wherein the field of view is specified via a user interface.

16. A computer graphics device for determining visibility of pixels in a viewing plane, comprising:
- receiving relative orientation and vertex data for a plurality of 3D objects in a 3D space;
- defining a viewing space relative to the 3D space by specifying a field of view and near and far clipping planes relative to a viewing point in the 3D space;
- transforming the viewing space and the 3D objects within the viewing space to a clipping-cube space;
- interpolating z and w values for each pixel in clipping-cube space from corresponding 3D objects;
- for each pixel at a particular x, y point in an image plane defined by the field of view and the viewing point, determining whether that pixel is occluded by any other pixels at the same x, y point; and
- wherein the determination of occlusion between any two pixels is accomplished by comparing a product of the z value of a first pixel and the w value of a second pixel with a product of the z value of the second pixel and the w value of the first pixel to determine which product is smaller.

17. The computer graphics device of claim 16 further comprising writing all visible pixels to a frame buffer.

18. The computer graphics device of claim 17 further comprising rendering the contents of the frame buffer to generate an image covering the extents of the image plane.

19. The computer graphics device of claim 16 further comprising a software instructions for providing a user interface for specifying one or more of:
- the near and far clipping planes;
- the viewing point; and
- the field of view.

20. The computer graphics device of claim 16 further comprising a first buffer for storing the z values, and a second buffer for storing the w values.

* * * * *